United States Patent
Iotti (10) Patent No.: US 10,697,737 B2
(45) Date of Patent: Jun. 30, 2020

(54) ARMOURING SYSTEM FOR SELF-PROPELLED WORK MACHINES

(71) Applicant: MANITOU ITALIA S.R.L., Castelfranco Emilia (Modena) (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 45 days.

(21) Appl. No.: 15/989,816

(22) Filed: May 25, 2018

(65) Prior Publication Data

US 2018/0364012 A1 Dec. 20, 2018

(30) Foreign Application Priority Data

Jun. 19, 2017 (IT) .................. 102017000067897

(51) Int. Cl.
| | | |
|---|---|---|
| *F41H 5/013* | (2006.01) | |
| *B62D 33/06* | (2006.01) | |
| *F41H 7/04* | (2006.01) | |
| *F41H 5/22* | (2006.01) | |
| *F41H 7/02* | (2006.01) | |
| *B66C 1/34* | (2006.01) | |
| *B66F 9/075* | (2006.01) | |
| *B66F 9/065* | (2006.01) | |

(52) U.S. Cl.
CPC ............. *F41H 5/013* (2013.01); *B62D 33/06* (2013.01); *B66C 1/34* (2013.01); *B66F 9/0655* (2013.01); *B66F 9/07545* (2013.01); *F41H 5/226* (2013.01); *F41H 7/02* (2013.01); *F41H 7/04* (2013.01); *F41H 7/044* (2013.01); *F41H 7/048* (2013.01)

(58) Field of Classification Search
CPC ... F41H 5/013; F41H 7/04; F41H 7/02; F41H 5/226; F41H 7/048; F41H 7/044; B62D 33/06; B66C 1/34; B66F 9/07545; B66F 9/0655

See application file for complete search history.

(56) References Cited

U.S. PATENT DOCUMENTS

| | | |
|---|---|---|
| 2009/0120273 A1 | 5/2009 | Eckdahl et al. |
| 2010/0037761 A1 | 2/2010 | Boczek et al. |
| 2010/0071539 A1 | 3/2010 | Boczek et al. |
| 2010/0077913 A1 | 4/2010 | Cunningham et al. |
| 2010/0192762 A1 | 8/2010 | Boczek et al. |
| 2011/0113953 A1 | 5/2011 | Boczek et al. |
| 2011/0115255 A1 | 5/2011 | Boczek et al. |
| 2012/0174766 A1 | 7/2012 | Boczek et al. |
| 2012/0181817 A1 | 7/2012 | Boczek et al. |

FOREIGN PATENT DOCUMENTS

| | | |
|---|---|---|
| EP | 1785689 A1 | 5/2007 |
| JP | 2005350994 A | 12/2005 |
| WO | 2008048700 A2 | 4/2008 |

*Primary Examiner* — D Glenn Dayoan
*Assistant Examiner* — Melissa Ann Bonifazi
(74) *Attorney, Agent, or Firm* — Pearne & Gordon LLP

(57) ABSTRACT

The armouring system for a self-propelled work machine (1) comprises: a cab frame (10) for the machine (1); and a plurality of armouring elements (21, 22, 23, 24, 25), made of armoured material, adapted to be fixed removably to respective portions of the frame (10), in order to define an armoured cab (2).

14 Claims, 9 Drawing Sheets

ARMOURING SYSTEM FOR SELF-PROPELLED WORK MACHINES

The present invention relates to an armouring system for self-propelled work machines, in particular telescopic handlers or telehandlers.

It is known that the armed forces of various countries use armoured self-propelled work machines, designed to be used in places where armed conflicts are happening or possible, e.g. war zones or bordering areas.

This type of machine is built with an armoured frame and fairing, so as to allow the survival of the driver in the event that the vehicle is affected by an explosion or is hit by bullets.

The known solution has some drawbacks, illustrated below.

First of all, since armoured machines have higher purchase and maintenance costs than those of normal work machines, the armed forces use the former only in very dangerous areas, typically outside national borders and often in remote places, whereas the latter are used on the national territory of their own country.

This solution is inefficient, since it forces armies to equip themselves with an excess number of machines with respect to normal use, in order to face the short periods in which significant uses of work machines are necessary both at home and in places of conflict.

Furthermore, the transport of known armoured machines from the country of origin to dangerous areas of use is extremely expensive and inconvenient, because of the weight and the dimensions of these vehicles. Further, it is known that once an armoured work machine of the known type is significantly damaged, e.g. because of the explosion of a land mine, it will be completely dismantled and will have to be replaced with a new machine, sustaining all the relative costs.

The technical task underpinning the present invention is therefore to propose an armouring system able to overcome the drawbacks of the prior art mentioned above and to satisfy market requirements.

The technical task is reached by the armouring system provided in accordance with claim 1.

Further characteristics and advantages of the present invention will become more apparent from the indicative and thus non-limiting description of a preferred, but not exclusive, embodiment of an armouring system, as illustrated in the accompanying drawings, in which.

With reference to the above-mentioned figures, reference numeral 1 indicates a self-propelled work machine associated with an armouring system according to the invention.

The work machine 1 may be a telescopic handler or telehandler with a fixed lifting arm 100, such as the one depicted, or of the rotary type.

The machine 1 proposed has been designed to be used both for special operations in dangerous contexts in which widespread use of weapons and explosive devices is made and in peaceful contexts, where special protection for the driver is not required.

Figure 1:
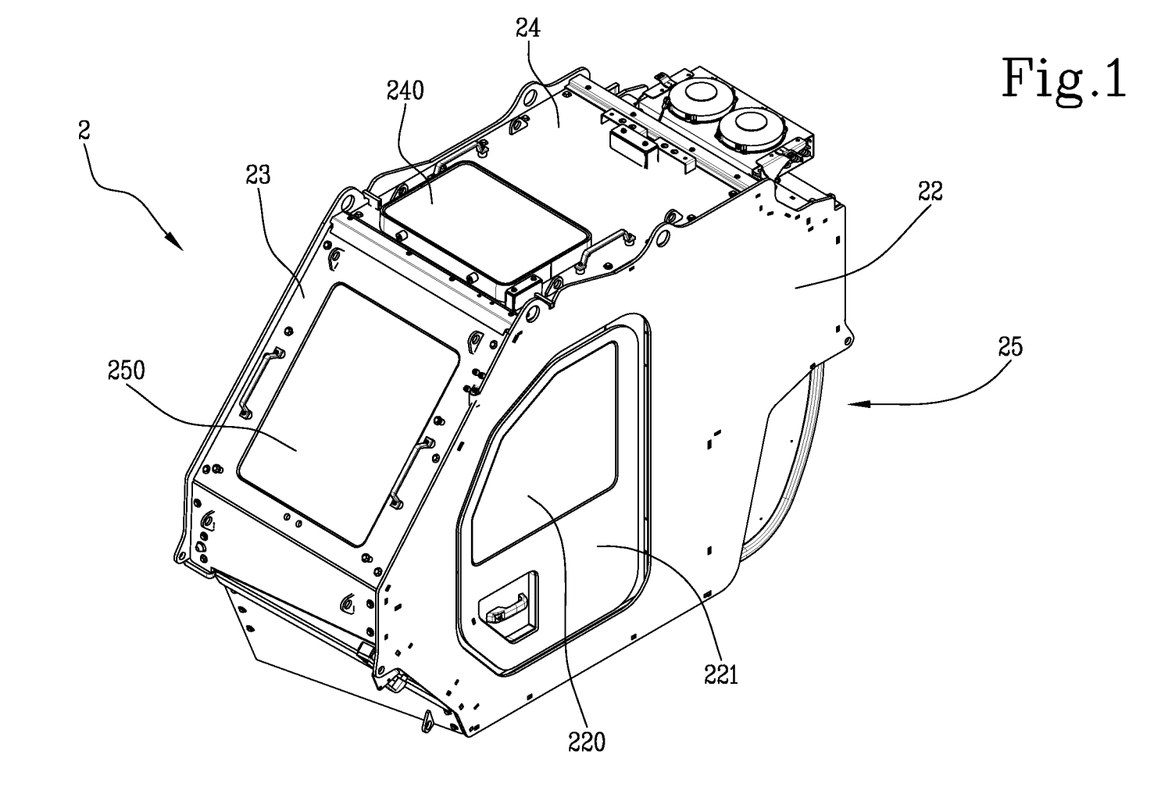
FIG. 1 is an axonometric view of an armoured cab for a self-propelled work machine, according to the invention.

In practice, the machine 1 envisages a first normal configuration, in which it has an unarmoured cab 3 (FIG. 3), or prevalently unarmoured, and a special configuration, in which it is provided with an armoured cab 2 (FIG. 1).

Figure 2:
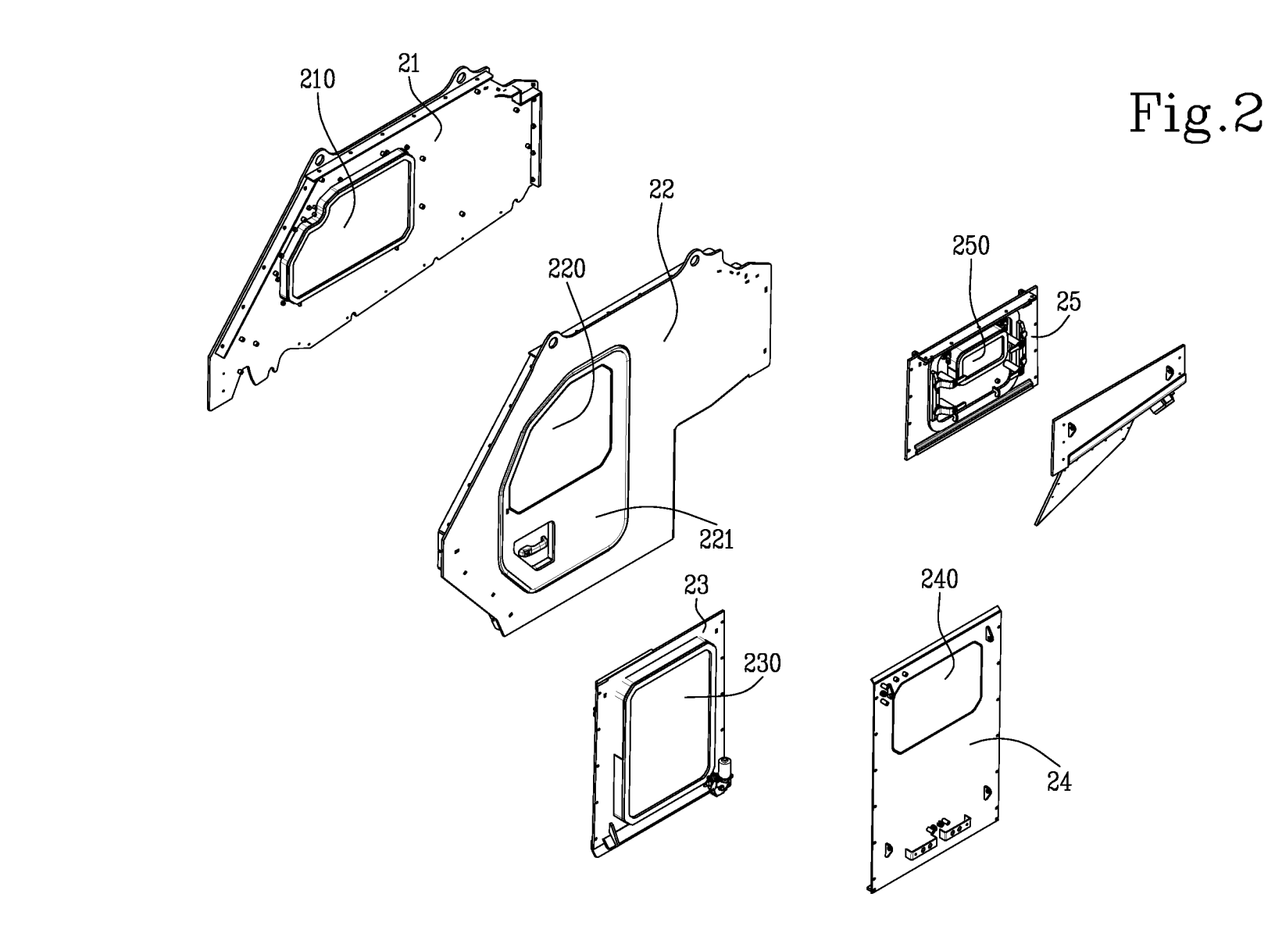
FIG. 2 is an axonometric view of the armouring elements included in the armoured cab of the preceding figure.

In even more detail, the machine 1 is provided with a cab frame 10, which represents the "skeleton" of the cab, as it is free from covers, on which two sets of external elements are removably mountable, one of which comprises armouring elements 21, 22, 23, 24, 25 (shown in FIGS. 1 and 2) and one which comprises covering elements 31, 32, 33, 34, 35 without armouring.

When the covering elements 31, 32, 33, 34, 35 are fixed to the cab frame 10, it is not armoured, or at least not completely armoured, for the purpose of a normal use of the machine 1 whereas, when the armouring elements 21, 22, 23, 24, 25 are fixed to the frame, the machine 1 can be used in special uses in which the safety of the operator could be at risk.

When the present description talks about armouring elements 21, 22, 23, 24, 25, reference is made to components made of armoured material.

The cab frame 10 is provided with various portions of its periphery onto which the armouring elements 21, 22, 23, 24, 25 or covering elements are applied, through a coupling means provided for that purpose.

As the cab frame 10 preferably has a generally polyhedral shape, even though it may include some curved components, reference will be made below to the "portions" mentioned in the previous paragraph as "sides" or "faces" of the frame.

Figure 5:
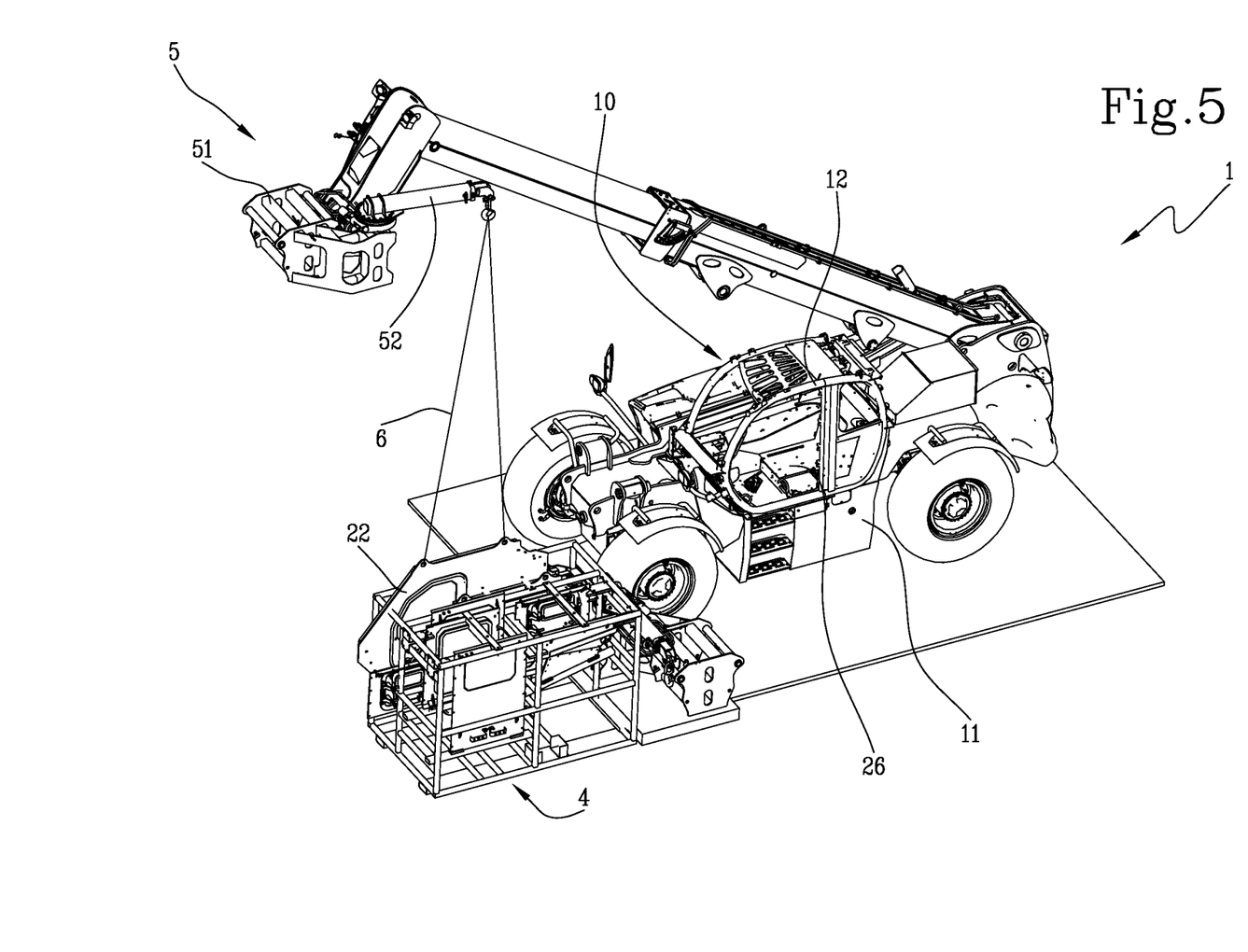
FIGS. 5-9 are axonometric views that show different steps of an assembly process of the armoured cab of a work machine according to the invention.
Figure 6:
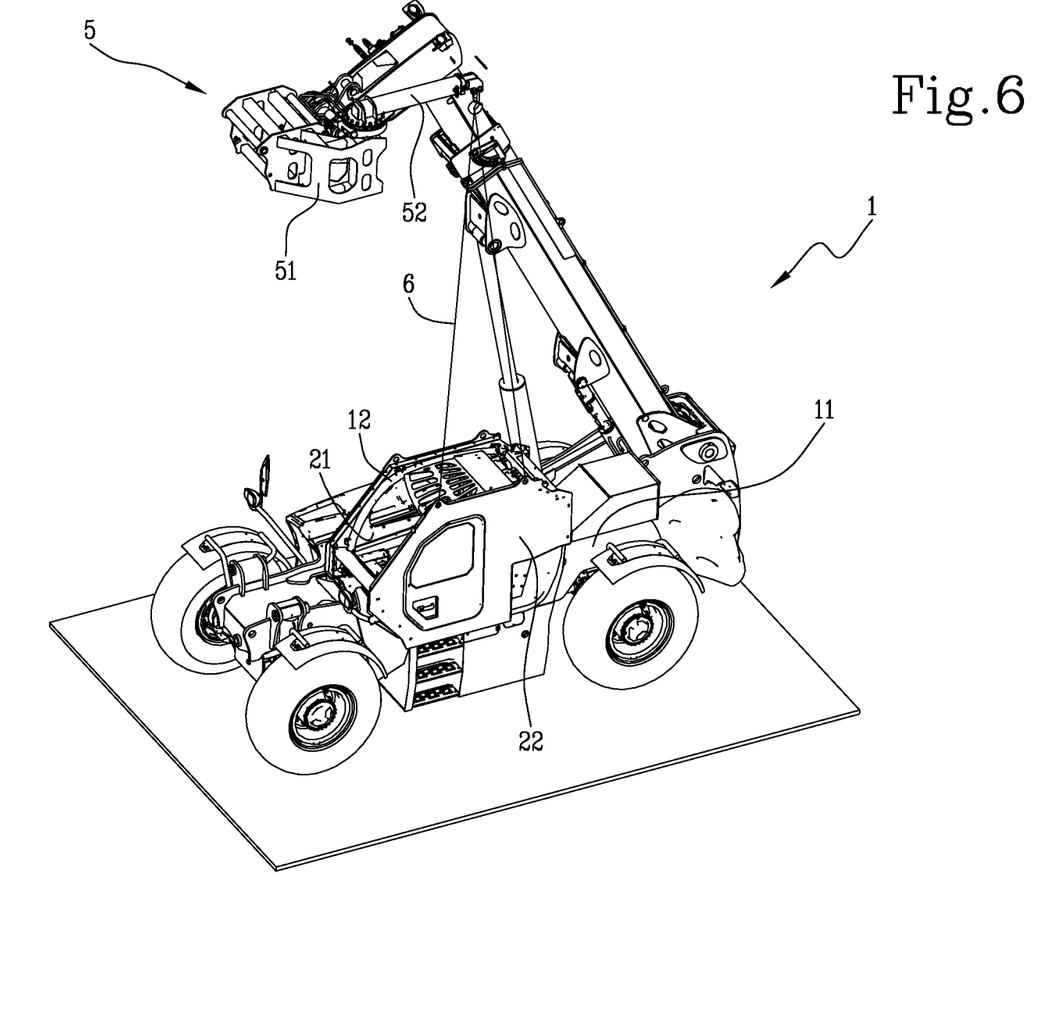
Figure 7:
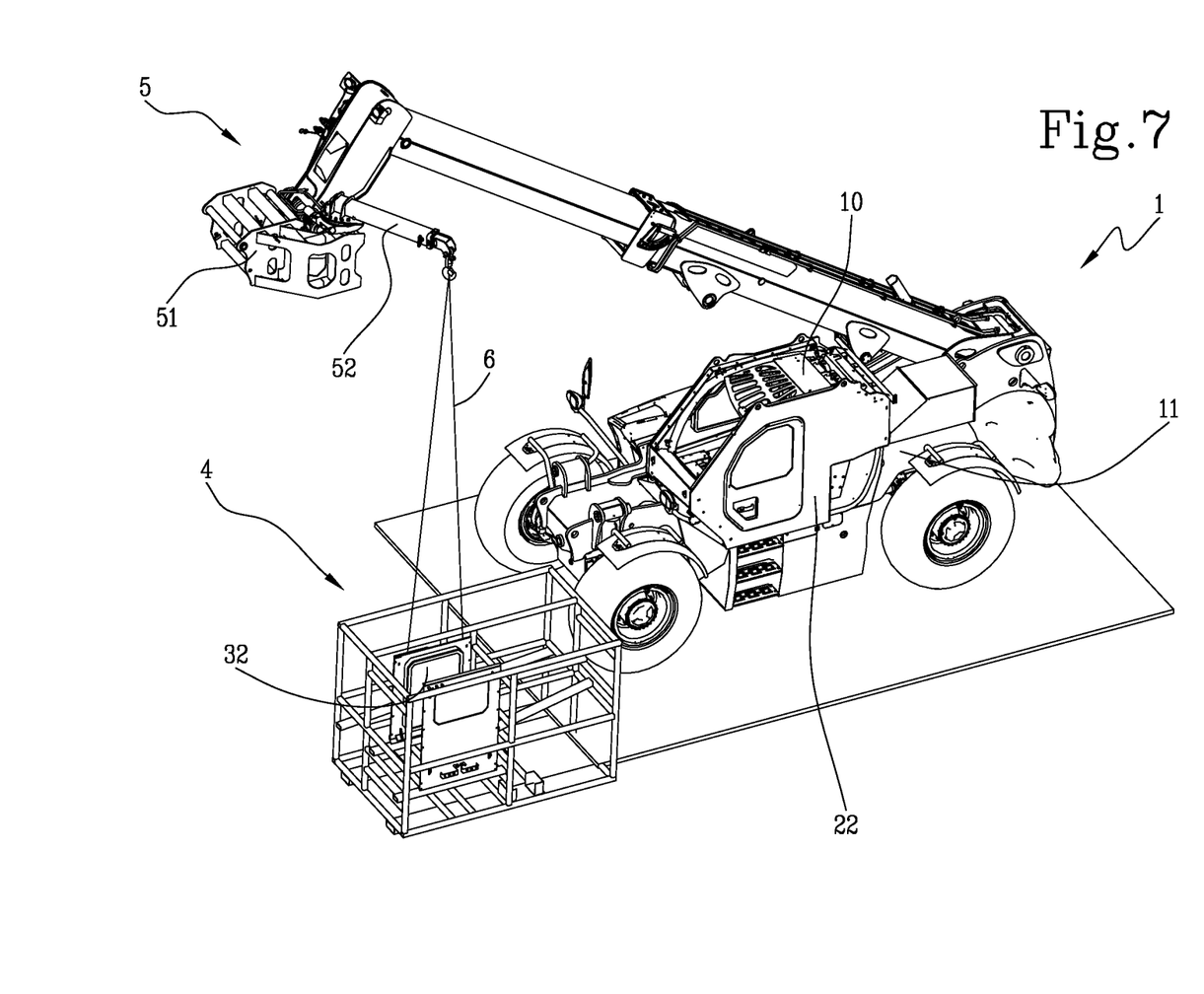
Figure 8:
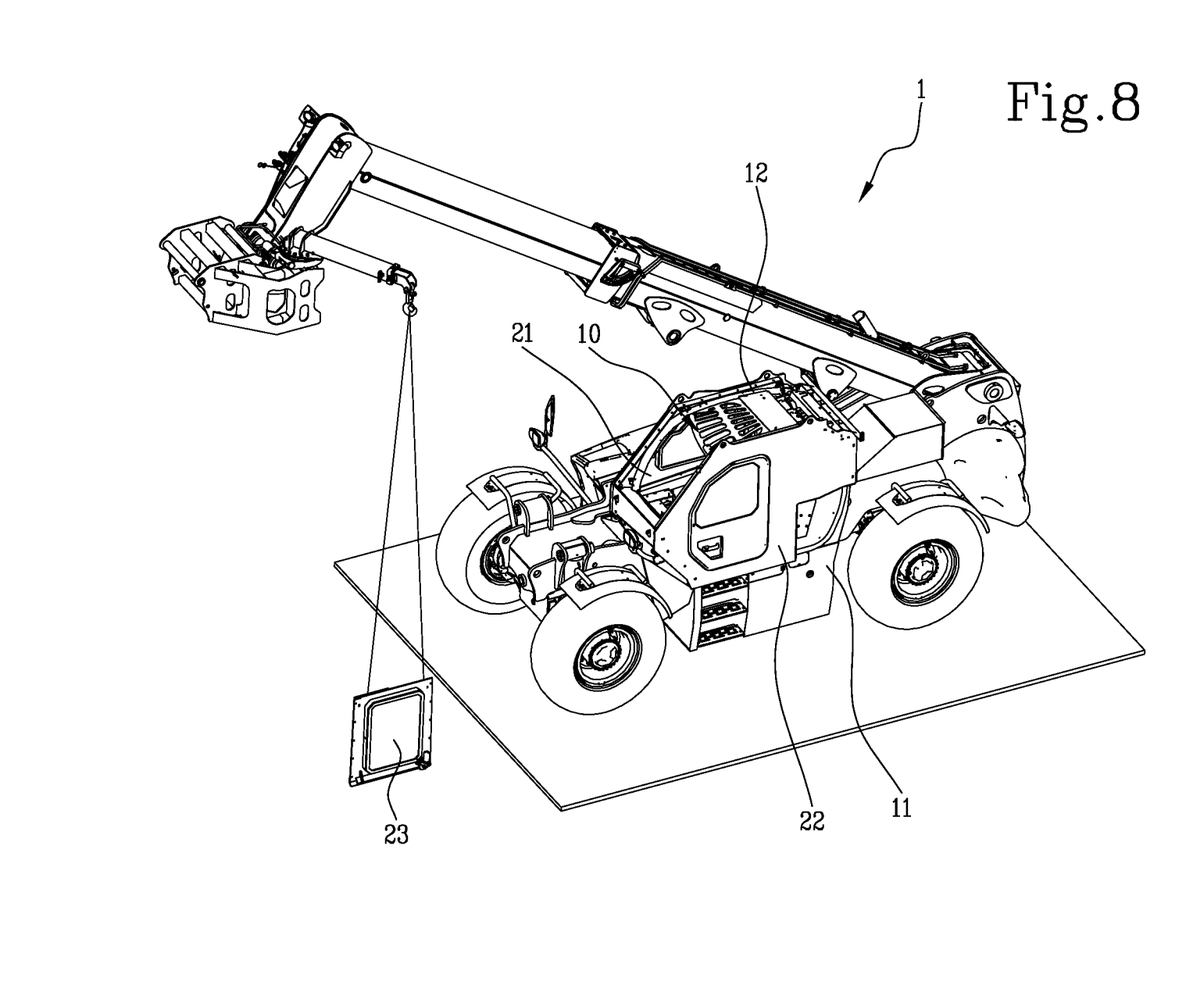
Figure 9:
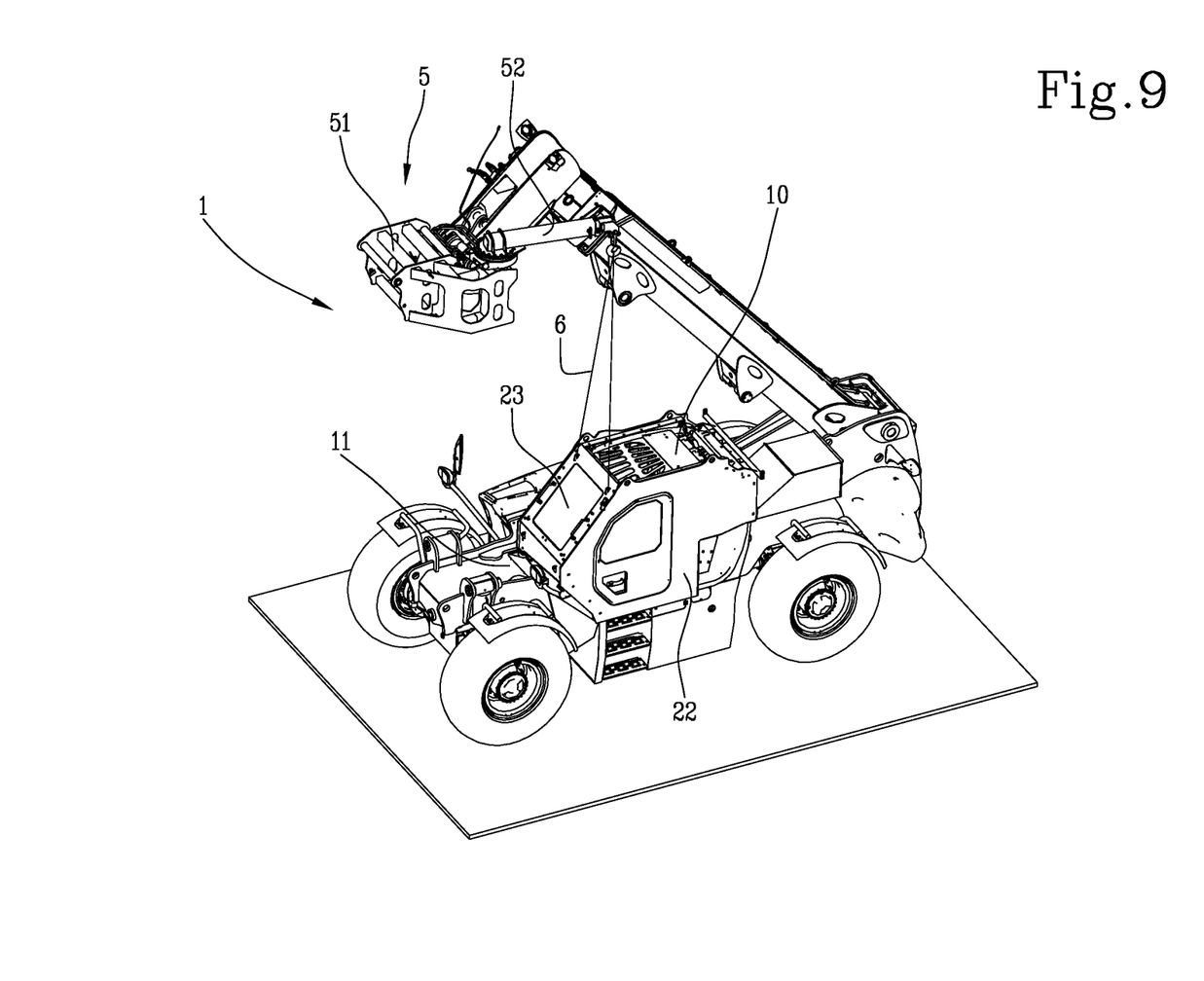

The cab frame 10 preferably comprises a reticular or "lattice" structure and may be provided with a fixed anchoring element 26 (see FIG. 5), i.e. non-removable, placed at the base thereof or floor of the cab, where the cab frame 10 is to be fixed to the support frame of the machine 1.

In practice, the floor armouring element 26 is intended to be surmounted by the driver's seat.

The cab frame 10 includes a plurality of sides that rise from the frame 11 of the machine 1 and are uncovered or "naked", being intended to be coupled, alternatively, to armouring elements 21, 22, 23, 24, 25 or to covering elements 31, 32, 33, 34, 35 (not armoured).

In the example depicted, the frame comprises five sides at which the elements are mounted that will define the armoured cab 2 or the unarmoured cab.

Figure 3:
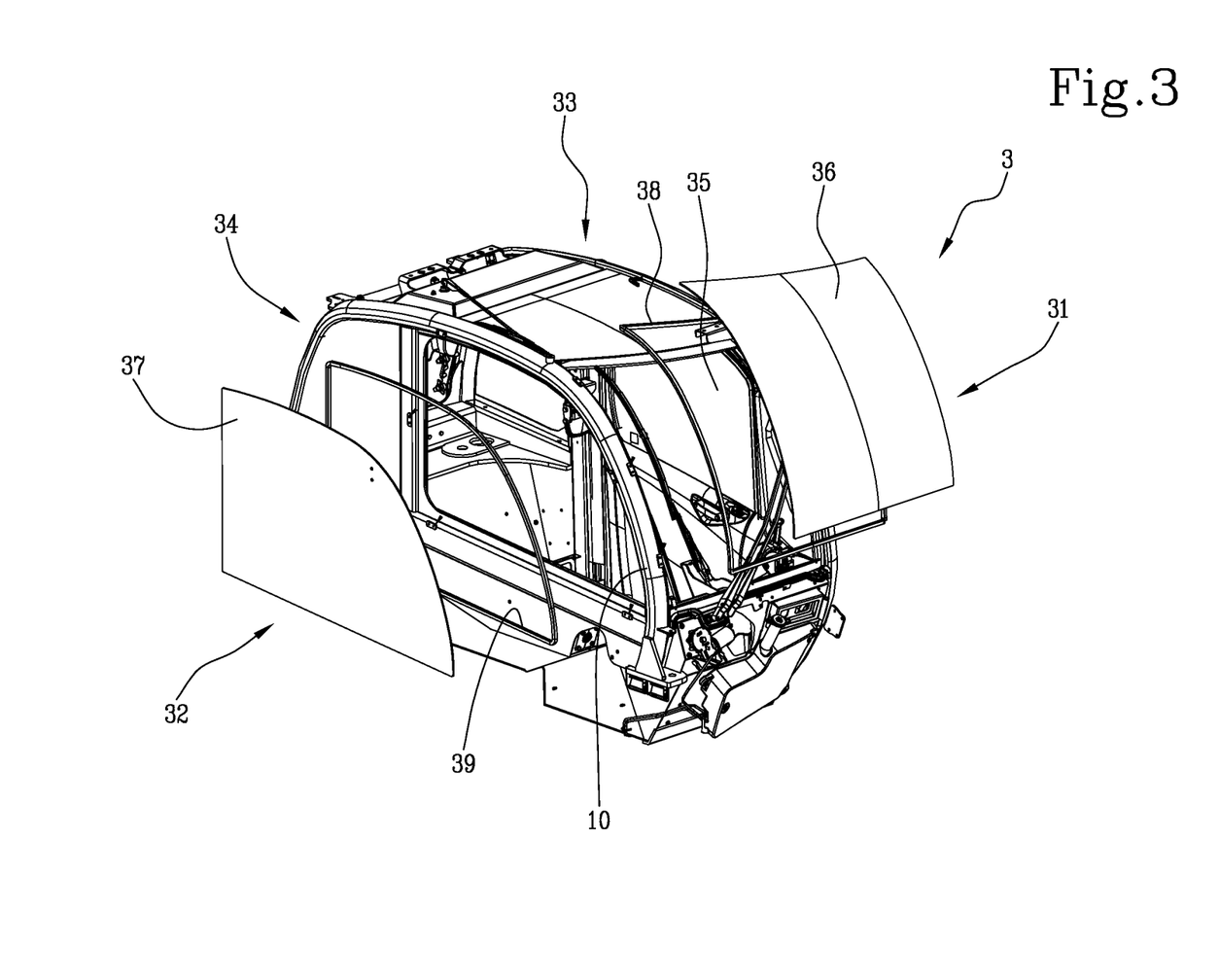
FIG. 3 is an axonometric, partially exploded, view of an unarmoured cab for a self-propelled work machine, according to the invention.

In detail, the cab frame 10 comprises a front side onto which an armouring/covering element 23, 31 is fixed which defines the front part of the cab 2, 3, two right and left sides on which the elements are mounted that define the right and left sides 21, 22, 32, 33 of the cab 2,3, an upper side in which an element is mounted which defines the roof 24, 33 of the cab 2,3, and a rear side in which an element is mounted that defines the back 25, 34 of the cab 2,3 (FIGS. 1 and 3 are compared).

The fixing means between the armouring/covering elements 21, 22, 23, 24, 25, 31, 32, 33, 34, 35 and the cab frame 10 may be comprised of bolts or similar coupling means; in detail, the armouring/covering elements 21, 22, 23, 24, 25, 31, 32, 33, 34, 35 may be mounted on bars 12 of the reticular structure, having a ring shape, that lie on respective vertical planes and that represent opposite flanks of the frame.

Furthermore, the elements 21, 22, 23, 24, 25, 31, 32, 33, 34, 35 themselves can be fixed to each other through a removable attachment means, such as bolts or the like.

Before illustrating further advantageous expedients of the invention, it is to be noted that already from what is described above it is clear how it overcomes the drawbacks of the prior art.

In fact, above all, the invention provides a single vehicle 1 that can be used both in normal operations, with an unarmoured cab 3, and for special operations in dangerous areas, in the configuration in which it has an armoured cab 2, all to the advantage of the flexibility and cost effectiveness of use.

Further, as the armouring elements 21, 22, 23, 24, 25, which are particularly heavy, can be separated from the vehicle 1 and therefore sent separately from it, the invention solves the transport problems highlighted in the discussion of the prior art.

Figure 4:
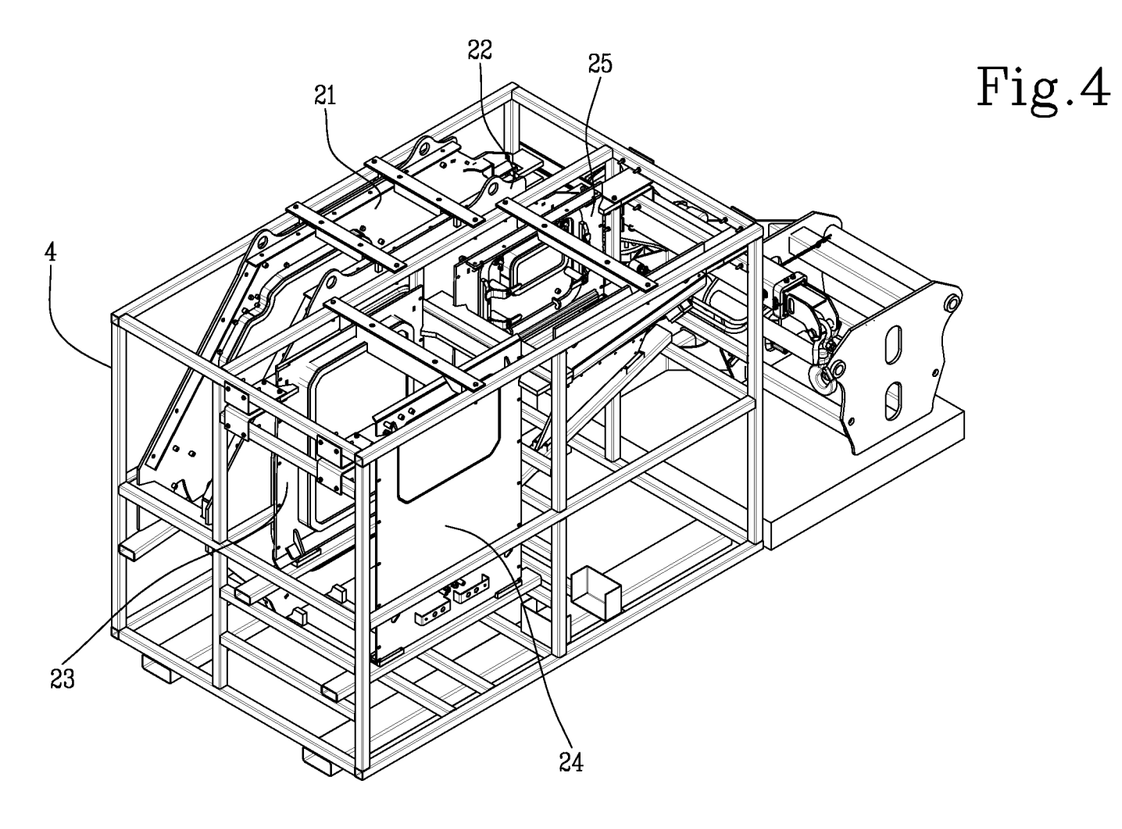
FIG. 4 is an axonometric view of a container for transporting the armouring elements shown in FIGS. 1 and 2.

In fact, in a particular embodiment of the armouring system proposed, a transportable container 4 is made available, preferably reticular and with a rack-like configuration, provided with internal compartments of shapes and sizes such as to house a respective armouring element 21, 22, 23, 24, 25, for shipping purposes (see in particular FIG. 4).

In this way, the armouring can be sent separately from the machine 1 provided with a "naked" cab frame 10 or with unarmoured covers, solving the logistical problems that affect the prior art.

It is also to be noted that the invention allows cost savings in the event that the machine 1, in its special use configuration with an armoured cab 2, is involved in a violent event such as the explosion of a land mine in proximity to or at the place where the machine 1 is transiting or working.

In fact, on one hand, the driver of the vehicle 1 would be protected by the armouring elements 21, 22, 23, 24, 25, on the other one or more of the elements themselves would remain intact even in the event that the rest of the machine 1 were compromised.

As the armouring elements 21, 22, 23, 24, 25 are not integrated into the machine 1, those that would remain intact following the explosion could be separated from the damaged skeleton of the vehicle and then reused.

Further preferred expedients of the armouring elements 21, 22, 23, 24, 25 of the invention and the mounting steps thereof are described below, before a description of the unarmoured covering elements 31, 32, 33, 34, 35.

Every armouring element 21, 22, 23, 24, 25 comprises one or more continuous plates made of armoured material, e.g. fully or partly made of metal, which are mounted at the relative sides of the cab frame 10.

Preferably, each plate is associated with an armoured glass slab 210, 220, 230, 240, 250, preferably integrated into the plate itself; in detail, the front armoured element or "nose" of the cab, comprises an armoured windscreen 230, just as the armoured roof comprises an upper window 240 and the armoured rear a sort of rear view window 250.

At least one of the armouring elements 21, 22 that define the sides of the cab 2 includes two plates, one of which is a base that is fixed directly onto the frame 10 and a second shaped plate 221, hinged to the first, which defines the exit/entry door to/from the cab 2 itself; in this case, the door bears the glass 220 of the relative window in an integrated way.

In more general terms, the invention provides one or more armouring elements 21, 22, 23, 24, 25 provided with at least one transparent or translucent slab 210, 220, 230, 240, 250 made of armoured material.

Advantageously, as shown in FIG. 1, the armouring elements 21, 22, 23, 24, 25 and in detail the respective slabs made of armoured material, are sized so that, once fixed to the cab frame 10 at the relative sides, no empty spaces are left between consecutive elements, defining a continuous armoured outer cover of the cab of the machine 1.

Further, according to a preferred aspect of the invention, the armoured rear 25 comprises an emergency door that can be opened from the inside of the cab 2, by a means provided for that purpose such as bolts with a triangular shaped head, or however a peculiar shape, and keys with a shaped ring for engagement with such bolts.

In this way, in the event of an explosion or however events that considerably damage the machine 1 of the invention, which could result in the door 221 getting stuck, the operator can leave the vehicle 1 by opening the emergency door.

It is not excluded that such emergency door could be located in another of the armouring elements 21, 22, 23, 24, 25 of the invention.

In the preferred embodiment shown in the figures, the invention comprises a mounting equipment 5 adapted to be removably attached to the lifting arm 100 of the machine 1 and provided to pick up, lift and position the armouring elements 21, 22, 23, 24, 25 for the purpose of mounting the cab 2.

In fact, the armouring elements 21, 22, 23, 24, 25 must absolutely be very heavy.

To be precise, the telehandler or other work machine 1 depicted, is equipped with an attachment device placed at the distal end of the telescopic arm 100, to which attachment device the mentioned mounting equipment 5 can be removably fixed.

It is also to be noted that the aforementioned transportable container 4 for the armouring elements 21, 22, 23, 24, 25 is adapted to be removably fixed to the attachment device of the lifting arm 100.

The equipment 5 is designed to pick up the armouring elements 21, 22, 23, 24, 25, one at a time, e.g. from the aforementioned transportable container 4 and to bring them to the relative faces of the frame 10, in order to allow operators to manually secure the elements, thus completing the assembly.

For that purpose, each of the armouring elements 21, 22, 23, 24, 25 comprises one or more handles.

The mounting equipment 5 can be a particular jib with a rotary arm, such as in the example shown in the appended figures and preferably includes a base body 51 that is mounted directly on the attachment device of the arm 100 of the machine 1 and a support arm 52, mounted so as to protrude with respect to the base body 52.

The protruding arm 52 is rotatable about an axis that passes through the base body 51, preferably vertical, and its rotation is controlled by an activation apparatus, e.g. of the hydraulic type or the electric type.

Preferably, the rotatable arm 52 is adapted to perform rotations of 180°.

The rotatable arm 52 of the jib 5 is provided with a hook on which a chain 6 is anchored which is connected at the bottom to the armouring element which must be mounted on the cab frame 10 on a case-by-case basis, to allow a sort of "self-assembly" of the proposed machine 1.

A preferential operating mode of the invention is illustrated below, with reference to the assembly of the armouring on the cab frame 10, with the aid of FIGS. 5-9, in which some steps of the assembly sequence are shown.

Once the vehicle 1 has been transported to a work area in which armed conflicts or similar dangerous conditions are taking place, the mounting equipment 5 is fixed onto the attachment device located at the end of the lifting arm 100 of the vehicle 1, which has an uncovered cab frame 10.

The transportable container 4 which includes the armouring elements 21, 22, 23, 24, 25 is carried by the machine 1 itself to the area in which it has been decided that the armouring operation must take place and then rested on the ground, separating it from the attachment device of the arm 100.

At this point, the jib 5 is mounted on the lifting arm 100 and a first armouring element, e.g. the armoured left side 22, is connected to the hook of the rotatable arm 52, e.g. through the mentioned chain 6.

At this point, the arm 100 can start to rise so in order to remove the side 22 from the container 4.

By coordinating the movements of the lifting arm 100 and of the support arm 52 of the jib 5, the side 22 is carried to the left side of the support frame 10, where the operators will secure it.

This operation is repeated for each of the armouring elements 21, 22, 23, 24, 25 until the complete covering of the frame 10, thus defining the armoured cab 2 of the invention.

It is to be noted that, if for example for the mounting of the side, the largest movement is the one performed by the lifting arm 100, for other elements, such as the front one, the rotation of the arm 52 of the jib 5 can also be rather extensive.

In a preferential embodiment of the invention, shown in FIG. 3, the unarmoured covering elements 31, 32, 33, 34, 35 are provided with a particular expedient that allows simpler and safer assembly and disassembly.

The windows of the covering elements 31, 32, 33, 34, 35, whether the front ones (i.e. the windscreen), lateral, upper or lower ones, are each formed by a piece of glass 36, 37, an annular seal 38, 39 that is interposed between the inner edge of the window and the piece of glass 36, 37 and an anti-vibration pressure means that presses the glass onto the respective seal.

Therefore, for the purpose of the disassembly of the unarmoured cab 3, the operator is allowed to separate the pieces of glass 36, 37 of the covering elements 31, 32, 33, 34, 35, from the metal plate(s) of the elements themselves; obviously, for assembly the opposite operation is performed.

The invention claimed is:

1. A telehandler (1) comprising an armouring system in turn comprising:
   a cab frame (10) for said telehandler (1); and
   a plurality of armouring elements (21, 22, 23, 24, 25), made of at least one armoured material, adapted to be fixed removably onto respective portions of said cab frame (10), defining an armoured cab (2);
   wherein said cab frame (10) is mounted fixed onto the frame of the telehandler (1) itself;
   wherein the telehandler (1) comprises a plurality of covering elements (31, 32, 33, 34, 35), without armouring, adapted to be removably fixed to respective portions of the cab frame (10), alternatively to the mounting of the armouring elements (21, 22, 23, 24, 25);
   wherein the telehandler (1) has a normal configuration, in which said covering elements (31, 32, 33, 34, 35) are fixed to the cab frame (10), defining an unarmoured cab (3), and a special configuration, in which the armouring elements (21, 22, 23, 24, 25) are fixed to the cab frame (10), defining an armoured cab (2);
   wherein the telehandler (1) comprises a telescopic lifting arm (100) provided with a distal end and a mounting equipment (5) adapted to be removably mounted at said distal end of the lifting arm (100);
   said mounting equipment (5) being adapted to lift the armouring elements (21, 22, 23, 24, 25) and to bring them to the relative portions of the cab frame (10), so as to allow operators to secure the elements to the respective portions.

2. The telehandler according to claim 1, wherein the cab frame (10) comprises a reticular structure.

3. The telehandler according to claim 2, wherein said reticular structure comprises bars (12) provided with an anchoring means adapted to allow the removable fixing of the armouring elements (21, 22, 23, 24, 25).

4. The telehandler according to claim 1, wherein the cab frame (10) has a substantially polyhedral shape.

5. The telehandler according to claim 1, wherein the armouring elements (21, 22, 23, 24, 25) each comprise at least one plate made of armoured material.

6. The telehandler according to claim 1, wherein a plurality of armouring elements (21, 22, 23, 24, 25) comprises at least one transparent or translucent slab (210, 220, 230, 240, 250) made of armoured material, defining respective windows of the cab.

7. The telehandler according to claim 5, wherein a plurality of armouring elements (21, 22, 23, 24, 25) comprises at least one transparent or translucent slab (210, 220, 230, 240, 250) made of armoured material, defining respective windows of the cab, and wherein said slab (210, 220, 230, 240, 250) is incorporated into a respective plate of the armouring element.

8. The telehandler according to claim 5, wherein one or more armouring elements (21, 22, 23, 24, 25) comprise a first plate intended to be fixed directly to the frame and a second plate, hinged to the first plate, defining an access/exit door (221).

9. The telehandler according to claim 7, wherein one or more armouring elements (21, 22, 23, 24, 25) comprise a first plate intended to be fixed directly to the frame and a second plate, hinged to the first plate, defining an access/exit door (221), and wherein said second plate (221) incorporates at least one armoured slab (220).

10. The telehandler according to claim 1, wherein the armouring elements (21, 22, 23, 24, 25) comprise one or more of the following: right side (21) of the cab, left side (22) of the cab, front part (23) of the cab, roof (24) of the cab, rear (25) of the cab.

11. The telehandler according to claim 10, comprising all the following armouring elements (21, 22, 23, 24, 25): right side (21) of the cab, left side (22) of the cab, front part (23) of the cab, roof (24) of the cab and rear (25) of the cab; the elements being sized so that, once fixed to the cab frame (10), there are no empty spaces left between consecutive elements.

12. The telehandler according to claim 1, wherein the cab frame (10) comprises a bottom (26) made of armoured material.

13. The telehandler according to claim 1, wherein said mounting equipment (5) comprises: a base body (51); a load support arm (52) mounted on said base body (51) so as to protrude and being rotatable about an axis that passes through the body; and an activation apparatus adapted to regulate the rotation of said support arm (52).

14. The telehandler according to claim 1, comprising a transportable container (4) provided with internal compartments of shapes and sizes such as to house a respective armouring element (21, 22, 23, 24, 25), for shipping purposes.

* * * * *